No. 783,322. PATENTED FEB. 21, 1905.
C. W. SMITH.
STAKE AND STAKE HOLDER.
APPLICATION FILED JULY 8, 1904.

2 SHEETS—SHEET 2.

WITNESSES:
Edward Thorpe.
C. P. Ferguson

INVENTOR
Cornelius W. Smith
BY
ATTORNEYS

No. 783,322. Patented February 21, 1905.

UNITED STATES PATENT OFFICE.

CORNELIUS W. SMITH, OF MAKAWELI, TERRITORY OF HAWAII.

STAKE AND STAKE-HOLDER.

SPECIFICATION forming part of Letters Patent No. 783,322, dated February 21, 1905.

Application filed July 8, 1904. Serial No. 215,829.

*To all whom it may concern:*

Be it known that I, CORNELIUS W. SMITH, a citizen of the United States of America, and a resident of Makaweli, Kauai, Territory of Hawaii, have invented a new and Improved Stake and Stake-Holder, of which the following is a full, clear, and exact description.

This invention relates to improvements in stakes and stake-holders, particularly for use on sugar-cane cars, but obviously adapted for use on other vehicles, the object being to provide a detachable stake and holder that cannot be destroyed by fire or easily lost and that is not liable to be stolen, thus providing a much more economical device than the usual wooden stakes, which are often left in the field and destroyed with burning trash or are stolen by laborers and used as fire-wood.

I will describe a stake and stake-holder embodying my invention and then point out the novel features in the appended claims.

Reference is to be had to the accompanying drawings, forming a part of this specification, in which similar characters of reference indicate corresponding parts in all the figures.

Figure 1:
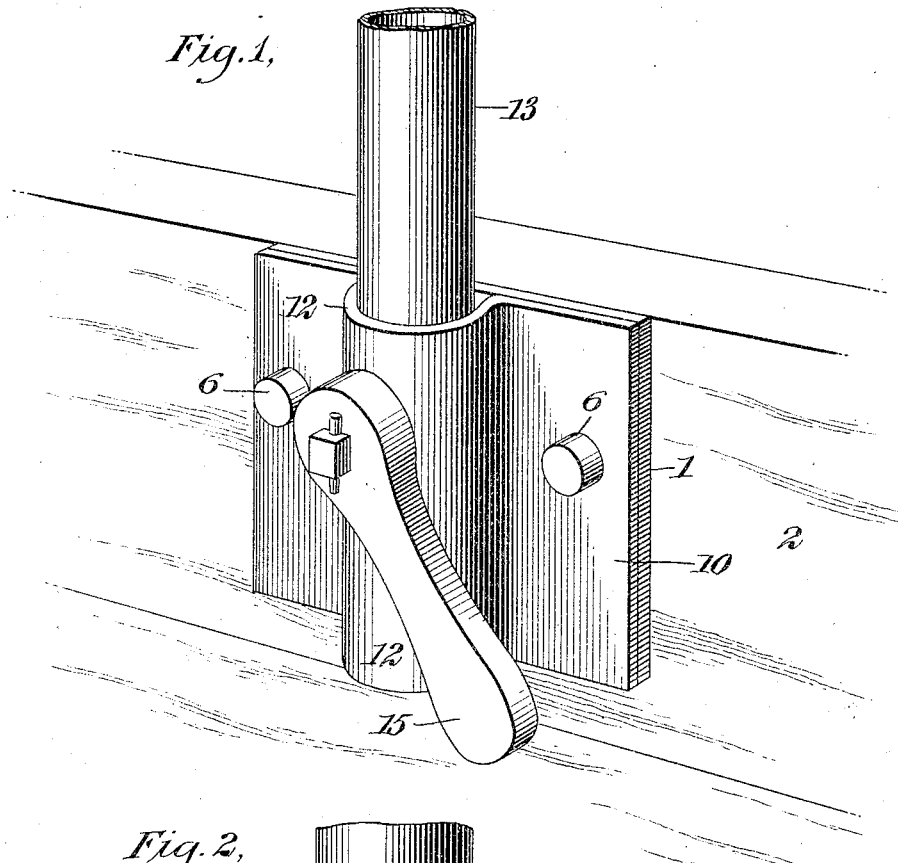
Figure 2:
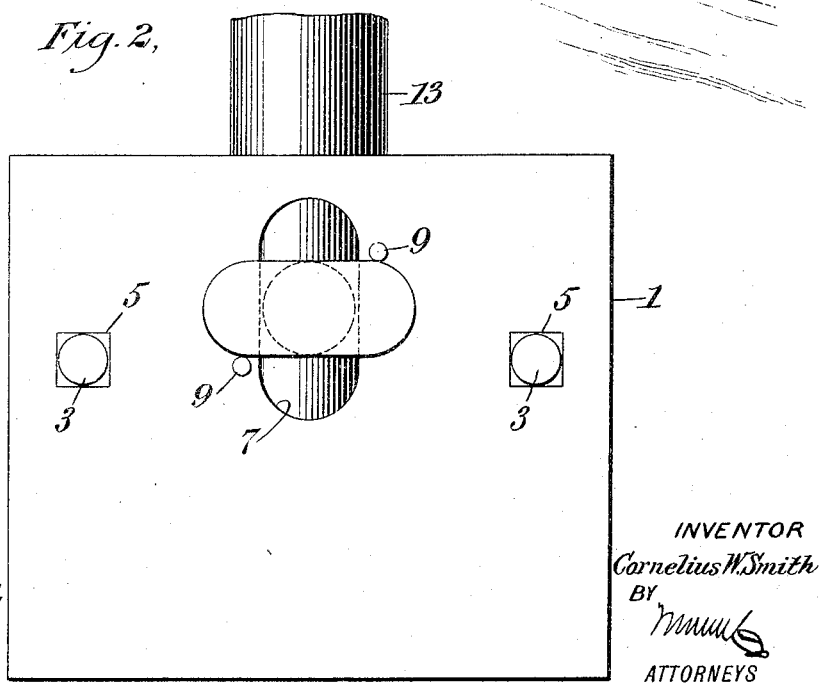
Figure 3:
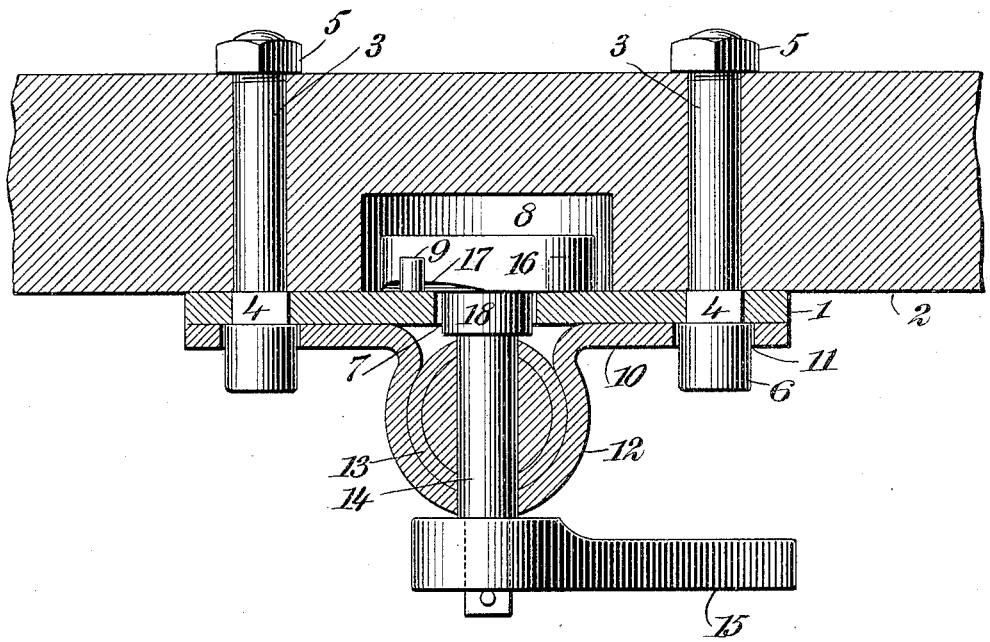
Figure 4:
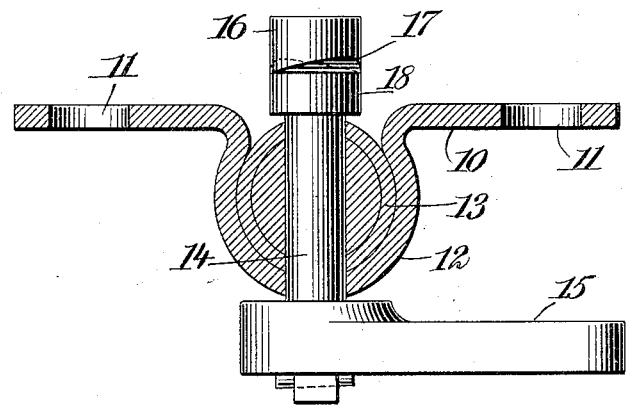

Figure 1 is a perspective view of a stake and holder embodying my invention. Fig. 2 is an inner side elevation thereof. Fig. 3 is a cross-section showing the device as attached to a vehicle, and Fig. 4 is a cross-section showing the stake and part of the holder removed from the vehicle.

The holder comprises a base-plate 1, designed to be secured to a side rail 2 of a car or vehicle. As here shown, the plate is secured to the rail by means of bolts 3, which pass through the rail and have angular portions 4 engaging in correspondingly-shaped openings in the plate, thus preventing the turning of the bolts when screwing on the nuts 5. Extended outward from the angular portions 4 the bolts are provided with heads 6, which are somewhat larger in diameter than the width of the angular portions, so as to engage closely against the plate 1. The plate 1 is provided with an elongated opening 7 in line with a recess 8, formed in the rail 2, and at the inner side of the plate, at opposite sides of the opening and near the opposite ends thereof, are stop-pins 9. The other member of the holder consists of an outer plate 10, having openings 11, through which the heads 6 may pass. Therefore these extended heads 6 form guides for placing the plate in position. The outer plate is provided with a socket member 12, open at the inner side, and is designed to receive the stake 13, consisting of suitable metal, and preferably tubular, for the sake of lightness and strength. Extended through an opening in the front of the socket member 12 and through openings in the stake 13 is a bolt 14, to the outer end of which is removably attached a handle-lever 15. On the inner end of the bolt 14 is a cross-head 16, which corresponds approximately in shape to the opening 7 and is designed to pass freely through the same. On its side adjacent to the base-plate the cross-head has reversely-inclined cam-surfaces 17. The bolt 14 at the part engaging in the opening 7 is enlarged, as indicated at 18, the diameter thereof being substantially the width of the opening 7, and thus the bolt will be prevented from lateral play when the parts are adjusted.

In the operation when it is desired to attach a stake the plate 10, with the stake and locking device, is placed in position—that is, the plate 10 passed over the heads 6 and the cross-head 16 passed through the opening 7. Then by giving a one-quarter turn to the bolt 14 by means of the lever 15 the cross-head will be moved to a position crosswise of the opening 7, and the cam-surfaces will cause a clamping or locking of the same, consequently locking the outer plate and stake in place. The lever 15 when the cross-head is in locking position will extend laterally and serve as a weight to prevent accidental releasing of the cam-head or the turning thereof on the bed-plate. The cross-head will be prevented from moving too far, however, by engaging with the pins 9. Of course to remove the stake it is only necessary to turn the bolt 14 until the head 16 can be passed out through the opening 7.

Having thus described my invention, I claim as new and desire to secure by Letters Patent—

1. A stake-holder comprising a bed-plate having an elongated opening, an outer plate having a socket member provided with an opening at the front, a bolt passing through said opening, a stake arranged in the socket member and through which said bolt passes, and a cam-head on the bolt adapted to pass through the elongated opening and to engage against the inner surface of the bed-plate.

2. A stake-holder comprising a base-plate having an elongated opening, an outer plate having a socket member, a stake in the socket member, a rotary bolt extended through the socket member and stake, and a cross-head on the inner end of the bolt adapted to pass through the elongated opening and having reversely-inclined cam-surfaces.

3. A stake-holder comprising a base-plate having an elongated opening, a stop-pin on the inner side of the plate, an outer plate having a socket member, a stake engaging in said socket member, a bolt passing through the socket member and through said stake, and adapted to rotate, a handle-lever on the outer end of the bolt, and a cross-head on the inner end of the bolt adapted to pass through said elongated opening and to engage with the stop-pin, the said head having reversely-inclined cam-surfaces.

4. A stake-holder comprising a base-plate, fastening-bolts therefor and having extended heads, said plate having an elongated opening, an outer plate having openings for receiving the bolt-heads, the said outer plate also having a socket member, a bolt passing through a wall of the socket member, a tubular metal stake arranged in the socket member and through which said bolt passes, and a cam-head on the inner end of said bolt adapted to pass through said elongated opening, and a lever on the outer end of the bolt.

5. The combination with a side rail, of a vehicle-body, the said side rail having a recess, of a bed-plate having an elongated opening in line with said recess, fastening-bolts passing through the bed-plate and secured in said rail, an outer plate having openings to receive the heads of said bolts, the said outer plate also having a socket member, a tubular metal stake engaged in said socket member, a bolt passing through the wall of the socket member and also through the stake, a cross-head on the inner end of the bolt and adapted to pass through said elongated opening, and into the recess, the said cross-head having reversely-inclined cam-surfaces, and a handle-lever on the outer end of the bolt.

In testimony whereof I have signed my name to this specification in the presence of two subscribing witnesses.

CORNELIUS W. SMITH.

Witnesses:
FRIEDRICH HAENISOH,
JAMES M. MUIR.